United States Patent
Dewald

(10) Patent No.: US 6,317,171 B1
(45) Date of Patent: *Nov. 13, 2001

(54) REAR-SCREEN PROJECTION TELEVISION WITH SPATIAL LIGHT MODULATOR AND POSITIONABLE ANAMORPHIC LENS

(75) Inventor: Duane S. Dewald, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/154,425

(22) Filed: Sep. 16, 1998

Related U.S. Application Data

(60) Provisional application No. 60/063,204, filed on Oct. 21, 1997.

(51) Int. Cl.[7] .................................. G02F 1/00; H04N 5/76
(52) U.S. Cl. ........................ 348/756; 348/781; 359/670; 359/668; 359/207
(58) Field of Search ..................................... 348/781, 742, 348/743, 756, 757; 359/822, 823, 824, 671, 668, 783, 501, 683

(56) References Cited

U.S. PATENT DOCUMENTS

| | | | |
|---|---|---|---|
| 3,719,419 | * | 3/1973 | Davee .................................. 353/101 |
| 5,635,997 | * | 6/1997 | Lewis .................................. 348/742 |
| 5,745,298 | * | 4/1998 | Yahagi ................................. 359/683 |
| 5,822,021 | * | 7/1999 | Johnson et al. ..................... 348/742 |
| 5,870,228 | * | 2/1999 | Kreitzer et al. ..................... 359/649 |
| 5,930,050 | * | 7/1999 | Dewald ............................... 348/756 |
| 5,946,142 | * | 8/1999 | Hirata et al. ........................ 348/781 |
| 5,975,703 | * | 11/1999 | Holman et al. ..................... 359/501 |
| 6,046,860 | * | 4/2000 | Hirata et al. ........................ 359/649 |

FOREIGN PATENT DOCUMENTS 0 507 297  *  7/1992  (EP) ............................... H04N/5/76

* cited by examiner

Primary Examiner—Reinhard J. Eisenzopf
Assistant Examiner—Trang U. Tran
(74) Attorney, Agent, or Firm—Charles A. Brill; Wade James Brady, III; Frederick J. Telecky

(57) ABSTRACT

A television receiver (10) that has a spatial light modulator (15) and a projection lens (17a) and that projects images to a screen (18). If the aspect ratio of the image to be displayed does not match that of the spatial light modulator (15), an anamorphic lens (17b) is positioned in the optical path of the image, between the projection lens (17b) and the screen (18). In this case and in typical applications, the spatial light modulator (15) generates an image that is anamorphically squeezed in the horizontal dimension, and the anamorphic lens (17b) widens the image so that the viewer perceives a normal wide-screen image on the screen (18).

12 Claims, 2 Drawing Sheets

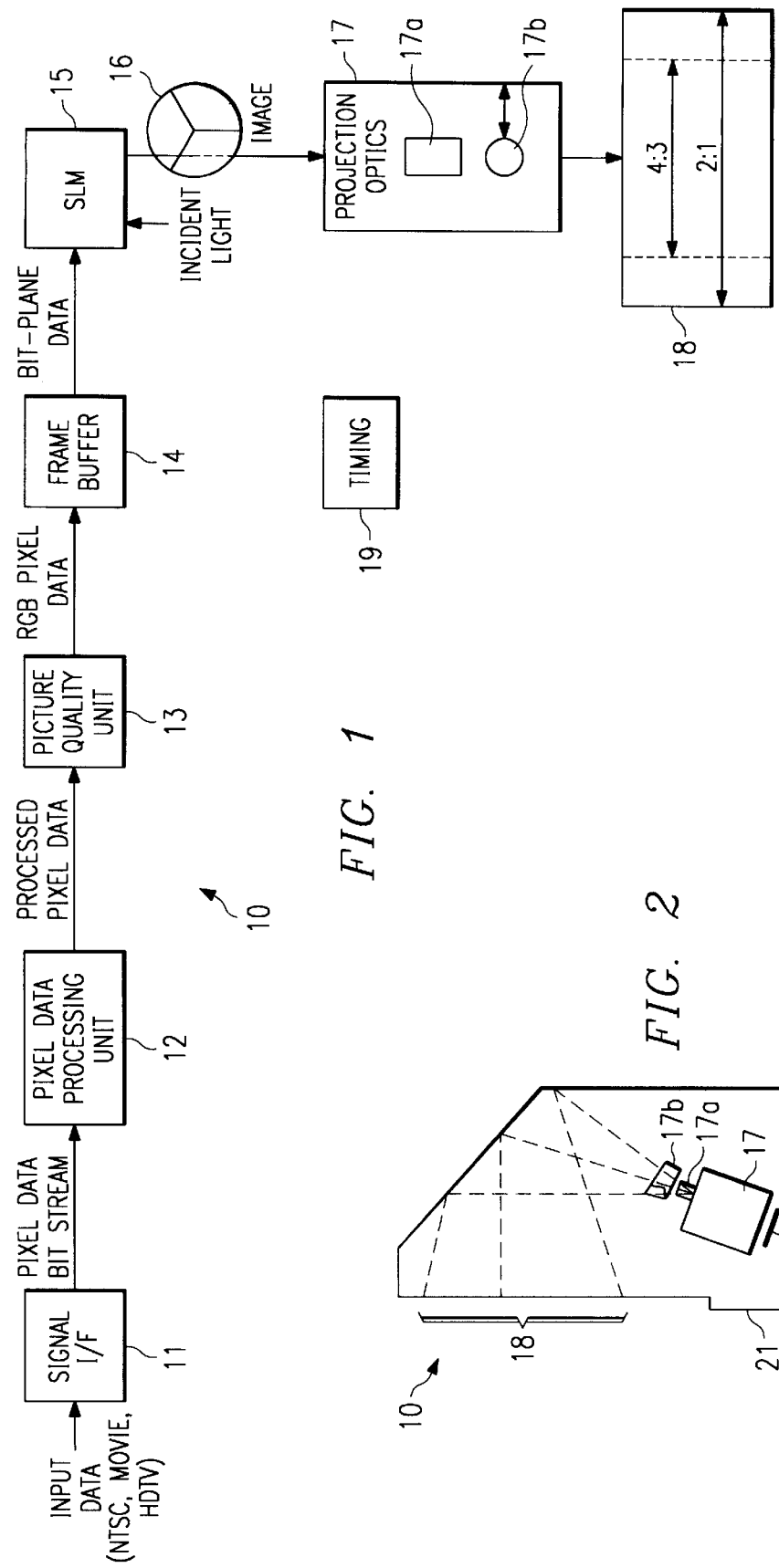

REAR-SCREEN PROJECTION TELEVISION WITH SPATIAL LIGHT MODULATOR AND POSITIONABLE ANAMORPHIC LENS

This application claims priority under 35 U.S.C. §119 (e) (1) of provisional application No. 60/063,204 filed Oct. 21,1997.

TECHNICAL FIELD OF THE INVENTION

This invention relates to spatial light modulator display systems, and more particularly to a television set having a spatial light modulator whose images may be either narrow or wide, as selected by positioning an anamorphic lens.

BACKGROUND OF THE INVENTION

One type of display system is a projection display system, where a projection lens is used to project the image to a screen. Movie theaters are one example of such display systems on a large scale. More recently, television sets and digital cinema systems have been developed that also use projection lenses. The projection lens may be for either front or rear projection, depending on whether the lens is on the viewer side of the screen or behind the screen.

Spatial light modulators (SLMs) are a type of display device that may use a projection lens. In general, SLMs are arrays of pixel-generating elements that emit or reflect light to the display screen via the projection lens. The SLM modulates light by turning the pixel-generating elements on or off.

An example of an SLM is a DMD (digital micro-mirror device). A DMD is an electromechanical device, whose pixel-generating elements form an array hundreds or thousands of tiny tilting mirrors. To permit the mirrors to tilt, each is attached to one or more hinges mounted on support posts, and spaced by means of an air gap over underlying control circuitry. The control circuitry provides electrostatic forces, which cause each mirror to selectively tilt. Incident light on the mirror array is reflected by the "on" mirrors in one direction and by the "off" mirrors in the other direction. The pattern of "on" versus "off" mirrors forms an image. In most applications, the light from the DMD is projected by a projection lens to a screen.

The size of the array of an SLM's pixel-generating elements determines the aspect ratio of the image it generates. For example, an SLM might have an array size of 1024×768, thereby generating images with an aspect ratio of 4:3. This 4:3 aspect ratio is consistent with NTSC television broadcast signals as well as those used for personal computer displays.

As display systems become more advanced, the variety of source data that they are capable of displaying has increased. Each type of source data may have its own format, that is, its own aspect ratio and vertical and horizontal resolution. For example, one advance is the availability of "digital cinema", in which movie films are digitized for display. Movie films are characterized by a wide aspect ratio, such as 2:1. Another advance is high definition television with wide aspect ratios, such as the 16:9 format.

For television applications, the conventional approach to displaying multiple formats with the same television set has been to use various data processing techniques, such as sampling or scaling, so that the data fits the SLM. For example, the television set might have a 4:3 SLM, and for displays having a different aspect ratio, the image is scaled so that it fills the SLM in at least one dimension. This can result in a display that does not fill the screen vertically for wide-screen displays, a display known as a "letterbox" display. U.S. patent application Ser. No. 08/333,200, entitled "A Multi-Format Television Architecture", and U.S. patent application Ser. No. 08/091,852, entitled "Method and Device for Multi-Format Television", describe methods of processing data to accommodate various display formats.

SUMMARY OF THE INVENTION

One aspect of the invention is a projection optics unit for a television receiver that uses a spatial light modulator to generate images to be displayed on a screen. The images may have different formats, such that they may have aspect ratios that differ from that of the spatial light modulator in at least one dimension. A projection lens projects the images along an optical path from the spatial light modulator to a screen. An anamorphic lens is moveable in and out of the optical path by a mechanism attached to the anamorphic lens. This mechanism is activated, in response to automatic format detection or user input, when the aspect ratio of the signal to be displayed is different, in at least one dimension, from that of the spatial light modulator. The anamorphic lens optically adjusts the image in that dimension. In typical applications, the anamorphic lens adjusts the image in the horizontal dimension, to provide an image whose aspect ratio is wider than that of the spatial light modulator.

In general, the invention recognizes that the image can be "squeezed" when generated by the SLM and then optically "stretched" to provide wide-screen images. Further, the means for optically widening the image can be moved in and out of the optical path, resulting in a "home theater" that can display a variety of display formats. For example, the same television set can display both 4:3 NTSC broadcasts and 2:1 movie films. The picture quality of the optically stretched image is comparable to that produced by conventional movie projection lenses.

The anamorphic lens permits the entire SLM array to be active for all formats. Thus, the same SLM can be used to display all formats without loss of picture size and light efficiency.

BRIEF DESCRIPTION OF THE DRAWINGS

FIG. 1 is a functional block diagram of a projection television receiver having a positionable anamorphic lens in accordance with the invention.

FIG. 2 illustrates the television receiver of FIG. 1, and especially illustrates the optical path of the image from the SLM through the projection lens and anamorphic lens to the screen.

DETAILED DESCRIPTION OF THE INVENTION

System Overview

Figure 3:
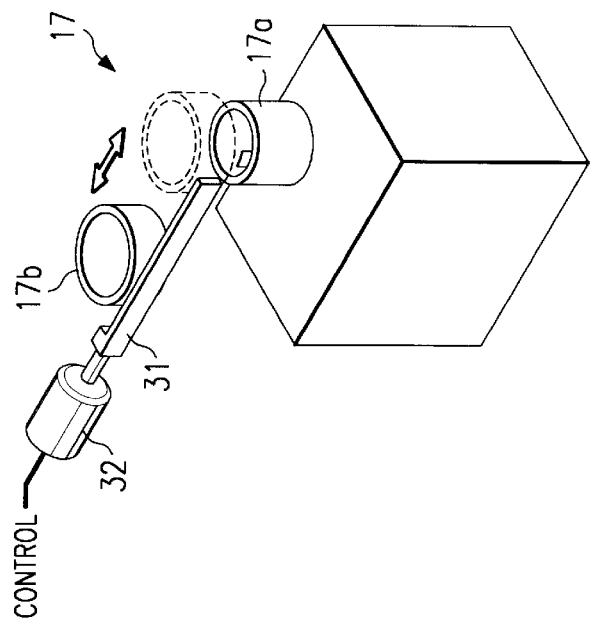
FIG. 3 illustrates how the anamorphic lens may be moved in or out of the optical path of FIG. 2.

FIG. 1 illustrates a television receiver 10 in accordance with the invention. Television receiver 10 comprises a signal interface 11, a pixel data processing unit 12, a picture quality unit 13, a frame buffer 14, a spatial light modulator (SLM) 15, a color wheel 16, a projection optics unit 17, a display screen 18, and a timing unit 18. FIG. 1 illustrates only those components of television receiver 10 significant to mains-screen pixel data processing and display. Other components, such as might be used for processing synchronization signals, audio signals, secondary screen features such as closed captioning, or graphics displays, are not shown.

For purposes of this description, television receiver 10 has a DMD-type SLM 15. Comprehensive descriptions of DMD-based display systems, without the features of the present invention, are set out in U.S. Pat. No. 5,079,544, entitled "Standard Independent Digitized Video System", U.S. patent Ser. No. 08/147,249, entitled "Digital Television System", and in U.S. Pat. No. 5,452,024, entitled "DMD Display System", each assigned to Texas Instruments Incorporated and incorporated by reference herein. Television receiver 10 could alternatively have some other type of SLM, such as an LCD.

Signal interface 11 receives display input signals. If the pixel information is in analog form, it is assumed that signal interface 11 has appropriate digitizing circuitry. The input signal into signal interface 11 might come from any one of a variety of sources, such as a television tuner, a data memory device, via a computer network, a DVD, or satellite source. A feature of the invention is that the signal may represent displays having formats with different aspect ratios.

Signal interface 11 demultiplexes and buffers the input signal, so as to provide pixel data as well as audio and timing signals. Signal interface 11 has appropriate filters and memory for performing these tasks.

Pixel data processing unit 12 receives pixel data from signal interface 11. It performs various processing tasks, such as decompression, de-interlacing, and scaling. In the case of the latter, the scaling may be either in the vertical or horizontal dimension. U.S. patent application Ser. Nos. 08/333,200 and 08/091,852, referenced in the Background and incorporated by reference herein, describe various methods of scaling and other processing to accommodate various display formats. As explained therein, horizontal scaling may be accomplished in a number of ways, such as by adjusting a sampling rate of an analog signal as well as by interpolation and decimation of pixel data. Vertical scaling is accomplished with interpolation and decimation. U.S. patent application Ser. No. 08/333,200 further describes how a display system may switch formats in response to either automatic format detection or manual selection by the user.

A feature of the invention is that television receiver 10 provides an alternative to scaling in the horizontal dimension. Instead, the images are generated in a form in which they are "squeezed" in the horizontal dimension and then "unsqueezed" optically by anamorphic lens 17b. If necessary, the images may be scaled in the vertical dimension. Horizontal scaling may be performed, as desired, alone or in addition to anamorphic squeezing, to fill the SLM 15.

Picture quality unit (PQU) 13 receives the processed pixel data from pixel data processing unit 12. This data may be referred to as "YCbCr pixel data". PQU 13 performs tasks such as colorspace conversion and de-gamma. Color space conversion converts YCbCr data to RGB data. The data may also undergo a de-gamma process, which linearizes the RGB data by removing the effect of a gamma correction that is processed into video signals at transmission. PQU 13 may also perform error diffusion to reduce quantization artifacts.

Frame buffer 14 receives processed pixel data from PQU 13. It formats the data into "bit-plane" format, and delivers the bit-planes to SLM 15 one at a time. This bit-plane format permits each display element of SLM 15 to be turned on or off in response to the value of one bit of data at a time. The formatting is performed by hardware associated with frame buffer 14.

In a typical television receiver 10, frame buffer 14 has a "double buffer" memory, which means that it has a capacity for at least two display frames. The buffer for one display frame can be read out to SLM 15 while the buffer for another display frame is being written. The two buffers are controlled in a "ping-pong" manner so that data is continuously available to SLM 15.

The bit-plane data from frame buffer 14 is delivered to SLM 15. Details of a suitable DMD-type SLM 15 are set out in U.S. Pat. No. 4,956,619, entitled "Spatial Light Modulator", which is assigned to Texas Instruments Incorporated and incorporated by reference herein. Essentially, SLM 15 uses the data from bit-plane buffer 14 to address each display element of its display element array. The "on" or "off" state of each display element forms an image. During a frame period, SLM 15 generates an image for each of three different colors (red, green, and blue) of a picture. These three images are sequentially displayed through a color wheel 16. The viewer's eyes integrate the sequential images so that the viewer perceives a full-color picture.

SLM 15 is assumed to be capable of generating an image that is "squeezed" in the horizontal dimension, that is, an image that requires an anamorphic lens in order to look normal. The squeezed image could be the result of the manner in which the source image is recorded for transmission, or it could be the result of some sort of processing within television receiver 10. The squeezed images are those having an aspect ratio that is wider in the horizontal dimension than that of the SLM 15. As explained below, the extent to which an image is squeezed substantially corresponds to a modification factor of the anamorphic lens 17b.

Projection optics unit 17 has optical components for receiving the image from SLM 15 and for projecting the image to a screen 18. These components include illumination path optics (not shown), a projection lens 17a, and anamorphic lens 17b.

As described below in connection with FIGS. 2–4, anamorphic lens 17b is moveable to a position in front of projection lens 17a. When so positioned, it optically stretches the image to provide a wide-screen display on screen 18.

Screen 18 is illustrated with dimensions appropriate for both "narrow" and "wide" aspect ratios. Examples of these aspect ratios are the 4:3 NTSC aspect ratio and the 2:1 cinema ratio, respectively. However, the invention is not limited to these formats, and in general, may be used to provide any two or more formats having different aspect ratios.

In other embodiments, three SLMs could be used to concurrently display images of three colors, such as red, green, and blue. These images would be optically combined and perceived by the viewer as a full-color image. Still other embodiments might use two SLMs with images of different colors-being either sequential or combined.

Master timing unit 19 provides various system control functions. Timing unit 19 may be implemented with a field programmable gate array (FPGA), to handle different frame resolutions and frame rates.

Positionable Anamorphic Lens

FIG. 2 is a cross-sectional view of television receiver 10, but explicitly showing only projection optics 17 and screen 18, as well as the television receiver housing 21. As illustrated, the image follows an optical path from the SLM 15 through the projection lens 17a and anamorphic lens 17b to the screen 18.

FIG. 3 is a more detailed view of the projection optics 17. As illustrated, anamorphic lens 17b may be moved in or out of the optical path of the image projected from projection lens 17a. In operation, the format of the image to be displayed is determined, either automatically or manually. If the format is different in the dimension compensated by anamorphic lens 17b, lens 17b is moved into the optical path.

The mechanics of re-positioning anamorphic lens 17b may be accomplished in any number of ways. For example, lens 17b may be placed on some sort of track 31 and a motor 32 used to move it back and forth. Motor 32 may be controlled with a CTL signal, which as stated above, may be generated automatically in response to format detection or by input from the user.

As stated in the Background, SLM 15 has an associated aspect ratio. In the example of this description, the aspect ratio of SLM 15 is 4:3. This is the aspect ratio of NTSC displays and conventional personal computer displays. If the image to be displayed has the same aspect ratio as that of the SLM 15, anamorphic lens 17b is moved to a position out of the optical path. However, if the image has a wider aspect ratio, anamorphic lens 17b may be moved into the optical path. In the latter case, anamorphic lens 17b provides an alternative or supplement to horizontal scaling so as to fill the SLM 15 in the horizontal dimension. To fill the SLM 15 in the vertical dimension, vertical scaling may be performed.

It should be understood that the same concepts could be applied to an anamorphic lens that stretches an image in the vertical dimension. However, today's formats tend to have the most variance in the horizontal dimension, and therefore lens 17b seems most suited for that dimension. Also, the invention could be extended to a combination of anamorphic lenses, one for the horizontal and one for the vertical dimension.

Figure 4:
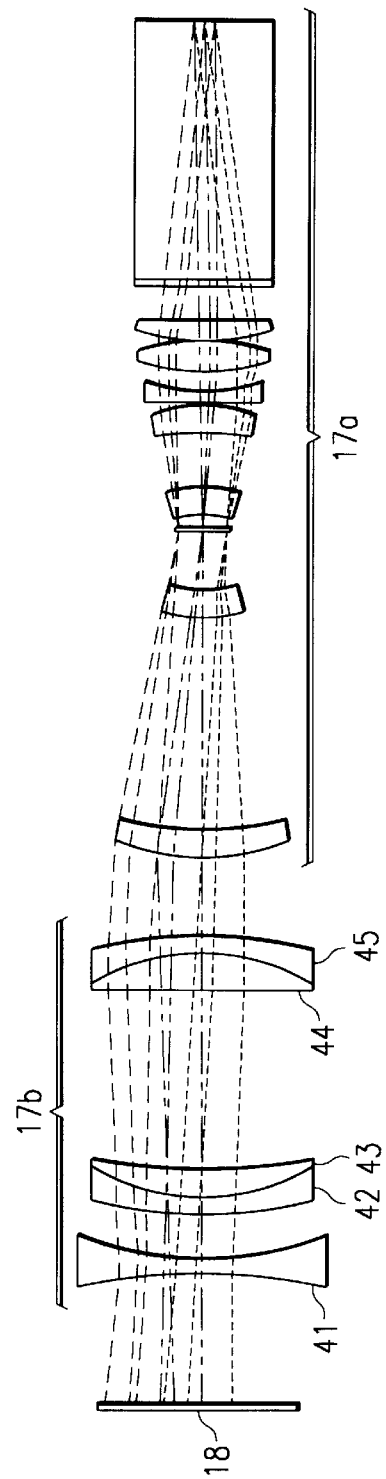
FIG. 4 is a top view of an anamorphic lens, suitable for use in the television receiver of FIG. 1.

FIG. 4 is a top view of an example of an anamorphic lens 17b suitable for use in television set 10. Other configurations of an anamorphic lens 17b could be used, with a common characteristic being their suitability for the relatively short throw ratios of home television receivers.

In the example of FIG. 4, anamorphic lens 17b has an aspect ratio modification ratio of 1.5:1. When placed in the optical path of an image from an SLM 15 having a 4:3 aspect, the displayed image has an aspect ratio of 2:1. However, the invention is not limited to a 4:3 display device. Nor is it limited to a lens 17b with a modification ratio of 1.5:1.

Anamorphic lens 17b is comprised of a series of five cylindrical lens elements 41–45. Elements 42 and 43 comprise a doublet, as do elements 44 and 45. The use of doublet elements is a feature that reduces light loss within the display system and increases the contrast ratio of the displayed image. In fact, lens 17b has been experimentally determined to have a transmission ratio of 97%.

Element 41 is a cylindrical bi-concave lens. Elements 42 and 43 are a "meniscus", that is, a combination of convex and concave surfaces, as are elements 44 and 45.

The extent to which anamorphic lens 17b modifies the aspect of the image it receives (herein referred to as its "aspect modification ratio") is determined by a number of factors. These include the radius, thickness, and type of glass of each element of lens 17b. Thus, the same configuration of lens elements 41–45 could be modified so as to have a different optical prescription thereby providing other modification-ratios.

The air space between lenses 43 and 44 may be adjusted to focus the displayed image in the horizontal dimension. In typical practice, the image from projection lens 17a is first focussed without anamorphic lens 17b. The image will be focussed in both dimensions but squeezed in the horizontal dimension. Then, lens 17b is placed in the optical path. The image focus in the vertical dimension will not be affected, but by varying the air space, the focus in the horizontal dimension is adjusted to unsqueeze the image.

The adjustability of the air space permits the same prescription of lens 17b to be used with a variety of projection lenses 17a. By changing the distance of the variable air space, lens 17b can be focussed to accommodate a particular projection lenses 17a.

A further feature of the invention is that the same prescription can be used for SLMs having different aspect ratios. For example, a 1.5:1 lens 17b has been satisfactorily tested with both a 4:3 and a 5:4 DMD, providing 2:1 and 1.85: images, respectively.

Further details and variations of anamorphic lens 17b are described in U.S. patent application No. 09/153,991, entitled "Anamorphic Lens for Providing Wide-Screen Images Generated by a Spatial Light Modulator", assigned to Texas Instruments Incorporated and incorporated by reference herein.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A projection television comprising:

a signal interface for receiving images according to a plurality of aspect ratios including a first and a second aspect ratio;

a pixel data processing unit for scaling, in at least one dimension, received images in the first aspect ratio, to fit a second aspect ratio;

a spatial light modulator for generating images to be displayed, the spatial light modulator having the second aspect ratio;

a projection lens operable to project images along an optical path from said spatial light modulator to a screen;

an anamorphic lens moveable in and out of said optical path, said anamorphic lens operable to optically adjust said image in said at least one dimension to match the first aspect ratio; and a mechanism attached to said anamorphic lens, operable to move said anamorphic lens in and out of said optical path.

2. The television of claim 1, wherein said first and second aspect ratios differ in the horizontal dimension and wherein said anamorphic lens stretches said images in said horizontal dimension.

3. The television of claim 1, wherein said first aspect ratio is 4:3.

4. The television of claim 1, wherein said anamorphic leans modifies images projected by the projection lens by 1.5:1.

5. A projection optics unit for a television receiver that uses a spatial light modulator to generate images to be displayed on a screen, where the spatial light modulator has an associated aspect ratio and the images may have aspect ratios that differ in at least one dimension from that of said spatial light modulator, comprising:
- a projection lens operable to project images along an optical path from said spatial light modulator to a screen;
- an anamorphic lens moveable in and out of said optical path, said anamorphic lens operable to optically adjust said image in said at least one dimension, having a series of lens elements comprising:
  - a first lens element that is a bi-concave lens;
  - a second lens element spaced from said first lens element and having a first surface that is convex;
  - a third lens element having a first surface that is convex, said second lens and said third lens formic a doublet;
  - a fourth lens element spaced from said third lens element to define an air space therebetween, and having a first surface that is planar; and
  - a fifth lens element having a first surface that is concave, said fourth lens element and said fifth lens element forming a doublet; and
- a mechanism attached to said anamorphic lens, operable to move said anamorphic lens in and out of said optical path.

6. The television of claim 5, wherein said air space between said third lens element and said fourth lens element may be adjusted to accommodate said projection lens having a throw ratio substantially in the range of 7:1 to 3:1.

7. A method of displaying images with different aspect ratios, using a television receiver having a spatial light modulator and a projection lens for projecting the images to a screen, said spatial light modulator having an associated aspect ratio, and said screen and said projector having an optical path between them, comprising:
- determining whether the aspect ratio of a spatial light modulator substantially matches the aspect ratio of one type of the images received by a television receiver;
- responsive to said determining step determining that said aspect ratios do not substantially match in at least one dimension:
  - scaling the received image in at least one dimension into a squeezed image corresponding to the aspect ratio of the spatial light modulator; and
  - positioning an anamorphic lens in said optical path, said anamorphic lens operable to optically resize said squeezed image in said at least one dimension; and
- responsive to said determining step determining that said aspect ratios substantially match, positioning the anamorphic lens out of said optical path.

8. The method of claim 6, wherein said aspect ratios differ in the horizontal dimension and wherein said anamorphic lens stretches said images in said horizontal dimension.

9. The method of claim 6, wherein said spatial light modulator has a 4:3 aspect ratio.

10. The method of claim 6, wherein said anamorphic lens modifies said aspect ratio of said spatial light modulator by 1.5:1.

11. A method of displaying images with different aspect ratios, using a television receiver having a spatial light modulator for generating the images at an associated aspect ratio, a projection lens for projecting the images to a screen along an optical path, and an anamorphic lens having a series of lens elements comprising a first lens element that is a bi-concave lens, a second lens element spaced from said first lens element and having a first surface that is convex, a third lens element having a first surface that is convex so that said second lens element and said third lens element form a doublet, a fourth lens element having a planar first surface and spaced from said third lens element to define an air space therebetween, and a fifth lens element having a first surface that is concave so that said fourth lens element and said fifth lens element form a doublet, the method comprising:
- determining whether the aspect ratio of a spatial light modulator substantially matches the aspect ratio of one type of the images received by a television receiver;
- if said determining step determines that said aspect ratios substantially match, positioning the anamorphic lens out of said optical path; and
  - if said determining step determines that said aspect ratios do not substantially match in at least one dimension, positioning an anamorphic lens in said optical path, said anamorphic lens operable to optically resize said image in said at least one dimension.

12. The method of claim 11, wherein said air space between said third lens element and said fourth lens element may be adjusted to accommodate said projection lens having a throw ratio substantially in the range of 7:1 to 3:1.

* * * * *